(12) United States Patent
Hsu

(10) Patent No.: US 9,790,978 B2
(45) Date of Patent: Oct. 17, 2017

(54) RECESSED HEAD SCREW

(71) Applicant: Hung-I Hsu, Kaohsiung (TW)

(72) Inventor: Hung-I Hsu, Kaohsiung (TW)

( * ) Notice: Subject to any disclaimer, the term of this patent is extended or adjusted under 35 U.S.C. 154(b) by 68 days.

(21) Appl. No.: 14/940,232

(22) Filed: Nov. 13, 2015

(65) Prior Publication Data

US 2017/0138386 A1 May 18, 2017

(30) Foreign Application Priority Data

Nov. 12, 2015 (TW) .................................. 104218192

(51) Int. Cl.
*F16B 23/00* (2006.01)
*F16B 25/00* (2006.01)
*F16B 25/10* (2006.01)

(52) U.S. Cl.
CPC ........ *F16B 23/0023* (2013.01); *F16B 23/003* (2013.01); *F16B 23/0015* (2013.01); *F16B 23/0038* (2013.01); *F16B 25/0015* (2013.01); *F16B 25/106* (2013.01)

(58) Field of Classification Search
CPC .. F16B 23/0023; F16B 23/015; F16B 23/003; F16B 25/103
USPC .......................................... 411/403, 402, 436
See application file for complete search history.

(56) References Cited

U.S. PATENT DOCUMENTS

| | | | | |
|---|---|---|---|---|
| 3,078,754 A * | 2/1963 | De Lacy | ................. | F16B 23/00 29/432 |
| 3,463,209 A * | 8/1969 | Podolsky | .............. | B25B 15/004 411/403 |
| 3,673,912 A * | 7/1972 | Herr | ..................... | F16B 23/0076 411/403 |
| 4,269,246 A * | 5/1981 | Larson | ............... | A61B 17/8615 411/403 |
| 5,207,132 A * | 5/1993 | Goss | ..................... | B25B 13/065 411/402 |
| 6,016,727 A * | 1/2000 | Morgan | ............. | A61B 17/8615 411/403 |
| 6,017,177 A * | 1/2000 | Lanham | ................ | F16B 23/003 411/402 |
| 8,382,414 B2 * | 2/2013 | Vandenberg | ........ | F16B 25/0015 411/386 |
| 2006/0266168 A1* | 11/2006 | Pacheco, Jr. | .......... | B25B 13/065 81/460 |
| 2012/0137842 A1* | 6/2012 | Guo | ..................... | F16B 23/003 81/460 |

(Continued)

*Primary Examiner* — Gary Estremsky
(74) *Attorney, Agent, or Firm* — Rosenberg, Klein & Lee

(57) ABSTRACT

A recessed head screw includes a shank, a head, a drilling portion and threads. The head includes a top face where a socket portion is formed. The socket portion has a driving recess and a driving socket formed between the driving recess and the top face. The driving socket communicates with the driving recess. A diameter value of the driving socket is a maximum circumscribed circle diameter value of the driving recess plus a value within 20% of the maximum circumscribed circle diameter value. When a driving tool engages the socket portion, the driving socket can be in close-fitting engagement with the driving tool to increase the engagement between the driving tool and the head and prevent the screw from falling off the tool easily during the driving action of the tool, thereby delivering a full driving force to the head to improve the working efficiency and smoothness.

6 Claims, 7 Drawing Sheets

(56) References Cited

U.S. PATENT DOCUMENTS

2015/0266169 A1* 9/2015 Campbell, II ........ F16B 23/003
  81/436
2016/0061246 A1* 3/2016 Campbell ............. B25B 15/004
  81/436

* cited by examiner

RECESSED HEAD SCREW

BACKGROUND OF THE INVENTION

1. Field of the Invention

This invention relates to a screw and relates particularly to a recessed head screw capable of engaging a driving tool firmly.

2. Description of the Related Art

Referring to FIG. 1, a conventional screw 1 includes a shank 11, a head 12 disposed at one end of the shank 11, a drilling portion 13 disposed at the other end of the shank 11 and a plurality of threads 14 spirally disposed on the shank 11. The head 12 has a driving socket 121 formed thereon. The driving socket 121, shown in FIG. 2, can be a slotted socket, a cruciform socket, a Pozi socket, a square socket, a hexagonal socket, a star-shaped socket, a Torx socket or other sockets. A driving tool (not shown) engages the driving socket 121 for rotating the screw 1 and drilling the threads 14 into an object (not shown).

For the sake of easy insertion of the driving tool, a dimension of a lower part of the driving tool is slightly less than a bore diameter of the driving socket 121. Therefore, the driving tool and the driving socket 121 are in loose engagement, namely the driving tool does not engage the driving socket 121 closely. However, such structure renders the driving socket 121 unable to receive a full driving force from the driving tool, so the screw 1 cannot be completely driven. Further, when the driving tool works, the driving tool may escape from the driving socket 121 even though the screw 1 does not drop down from the tool at the time of operating the driving tool whose drilling portion 13 is set above the object to execute a downward operation which exerts a downward driving force on the head 12. If the driving tool is set below the object to provide an upward operation which gives the head 12 an upward driving force, the loose engagement between the driving tool and the driving socket 121 causes the screw 1 to fall off the driving tool easily and renders the operation unable to work smoothly.

If the driving socket 121 is a slotted socket, a cruciform socket or a Pozi socket, the driving socket 121 usually has slanting walls. The driving tool may slip out of the driving socket 121 easily because the driving tool is subjected to the loose engagement and the slanting walls. Thus, the driving tool cannot deliver a driving force to the screw 1 efficiently. It is also noted that the user has to hold the driving tool with one hand and hold the screw 1 with the other hand in order to drive the screw 1, regardless of the direction of the driving force. This action generally brings about difficulty in using the driving tool.

To solve the aforementioned problems, a conventional driving tool having the magnetic force has been invented to allow the driving tool to attract the head 12 of the screw 1 for engagement. However, there is a large amount of iron debris during the process of manufacturing large numbers of screw products, so some iron debris may be left within the driving socket 121. However, if the driving tool attracts the iron debris left in the driving socket 121 in the long term, the magnetic force of the driving tool may be reduced, and the reduced magnetic force may also render the driving socket 121 of the screw 1 unable to be driven by the driving tool efficiently. Thus, the working efficiency is still reduced.

SUMMARY OF THE INVENTION

An object of this invention is to provide a recessed head screw which snugly engages different kinds of driving tools to prevent the driving recess of the screw from being broken and to prevent the screw from dropping down from the driving tool easily.

The recessed head screw of this invention comprises a shank, a head disposed at one end of the shank, a drilling portion disposed at another end of the shank, and a plurality of threads spirally disposed on the shank. The head includes a top face which has a socket portion formed thereon and a bottom face connected between the top face and the shank. A driving tool engages a socket portion for driving the screw. The socket portion has a driving recess enclosed by a plurality of interconnected walls and a driving socket formed between the driving recess and the top face. The driving socket communicates with the driving recess. A diameter value of the driving socket is a maximum circumscribed circle diameter value of the driving recess plus a value within 20% of the maximum circumscribed circle diameter value. Accordingly, when the driving tool is inserted into the driving recess which can be in various shapes, the driving socket punched by precision processing and located between the driving recess and the top face can snugly engage the driving tool to increase the engagement of the driving tool with the socket portion. The increase in the engagement prevents the driving tool from escaping from the driving socket and prevents the screw from dropping down from the driving tool easily. Thus, a full driving force of the driving tool can be delivered to the head efficiently and evenly to facilitate the fastening work. The walls of the driving recess are not easily broken by the driving tool because of this even delivery action, thereby improving the working efficiency and promoting the smoothness of the operation.

Preferably, the driving tool has a shaft portion and an insertion portion connected thereto. The shaft portion and the driving socket are in close-fitting engagement when the insertion portion is inserted into the driving recess.

Preferably, the driving recess can be a slotted recess, a cruciform recess, a Pozi recess, a triangular recess, a square recess, a star-shaped recess, a Torx recess, a polygonal recess, or other suitable shapes.

Preferably, a depth value of the driving socket is at least 15% of the maximum circumscribed circle diameter value of the driving recess.

The advantages of this invention are more apparent upon reading following descriptions in conjunction with accompanying drawings.

DETAILED DESCRIPTION OF THE PREFERRED EMBODIMENTS

Figure 1:
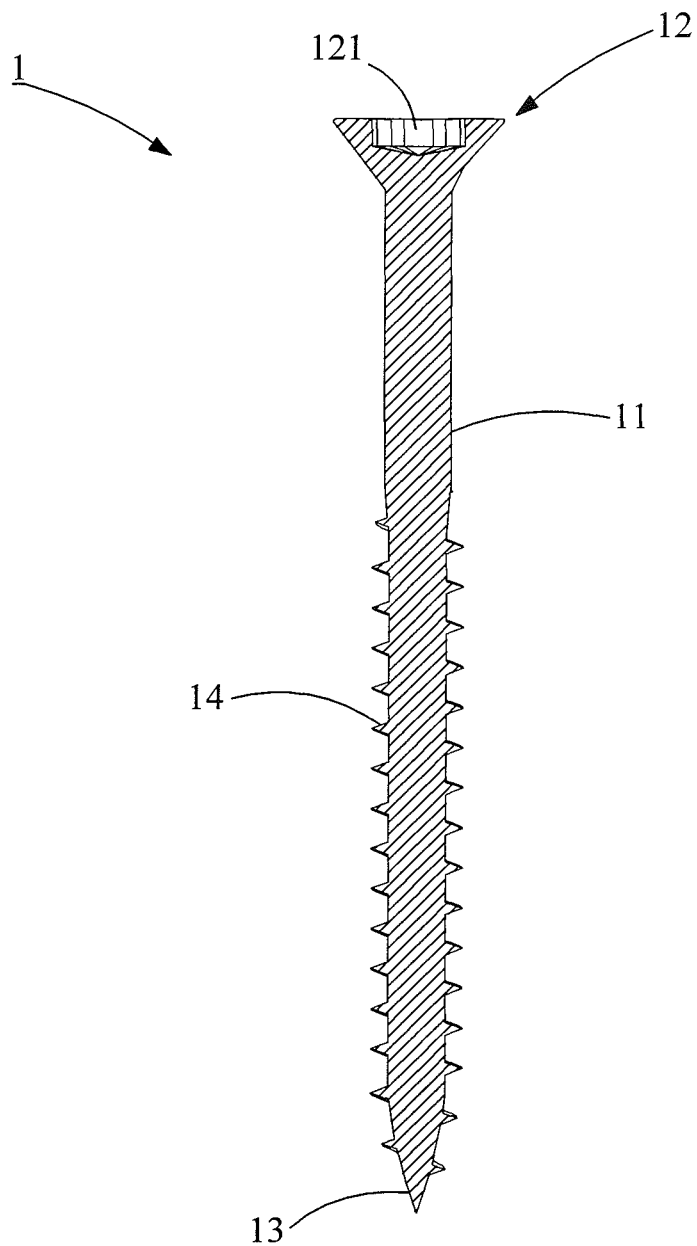
FIG. 1 is a schematic view showing a conventional recessed screw.
Figure 2:
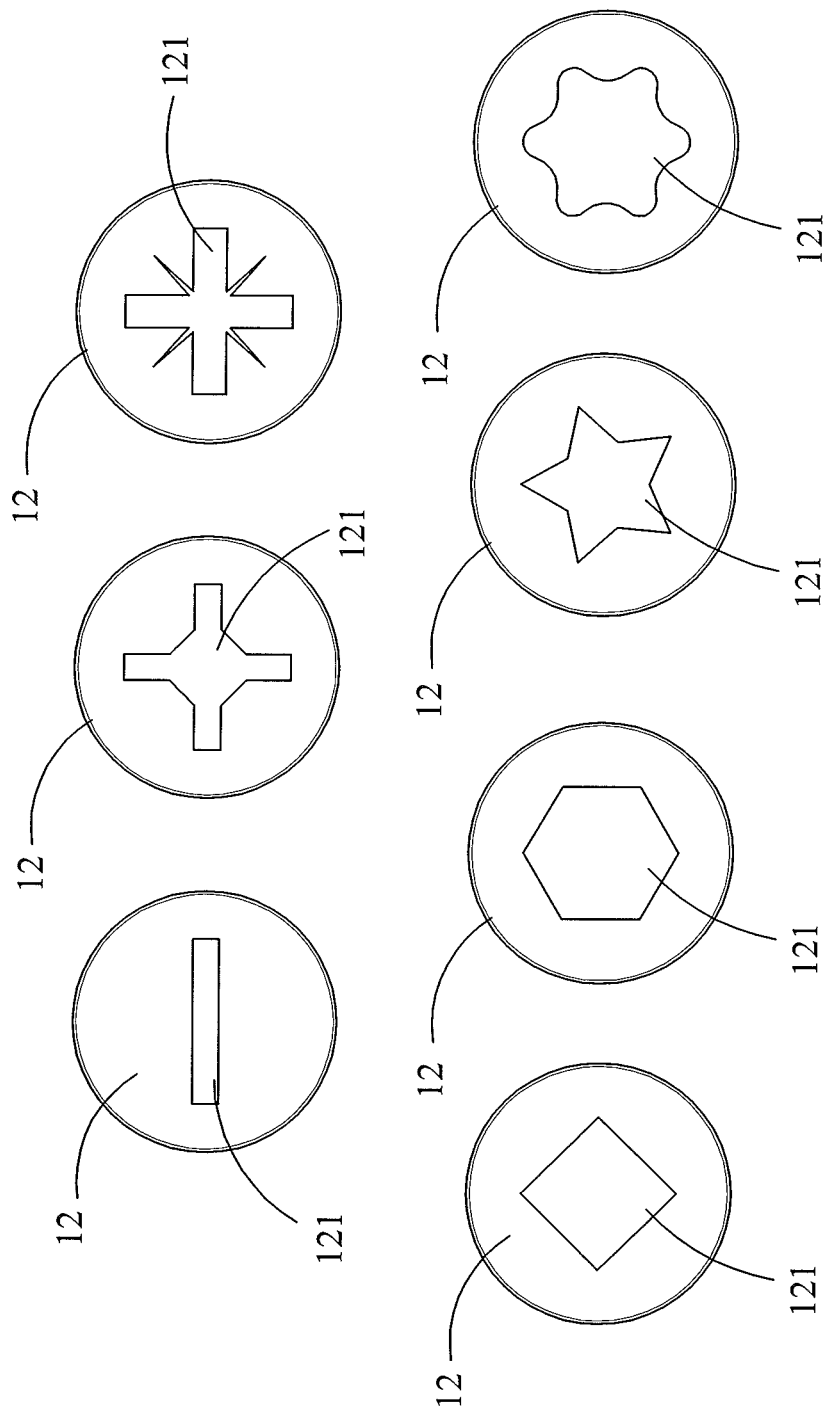
FIG. 2 shows top plan views of universal driving sockets of the conventional recessed screw.
Figure 3:
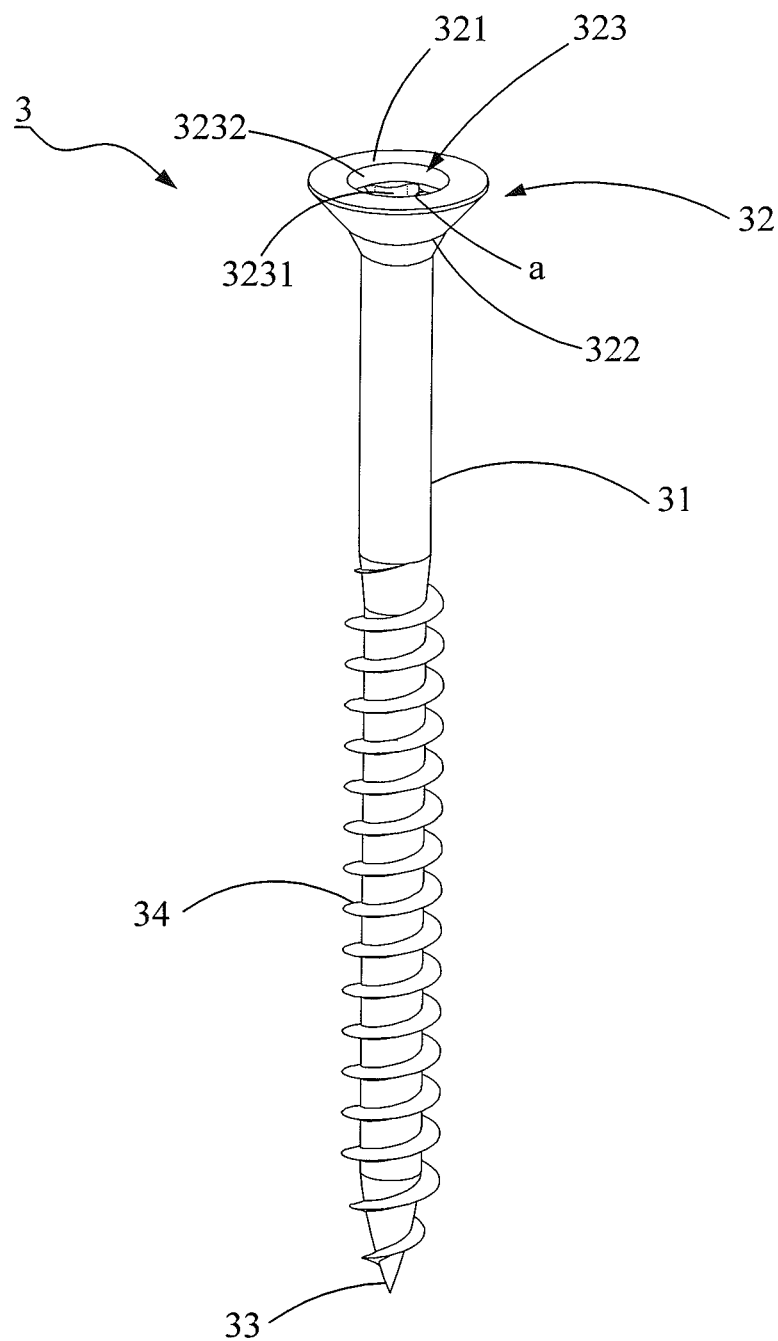
FIG. 3 is a perspective view showing a first preferred embodiment of this invention.
Figure 4:
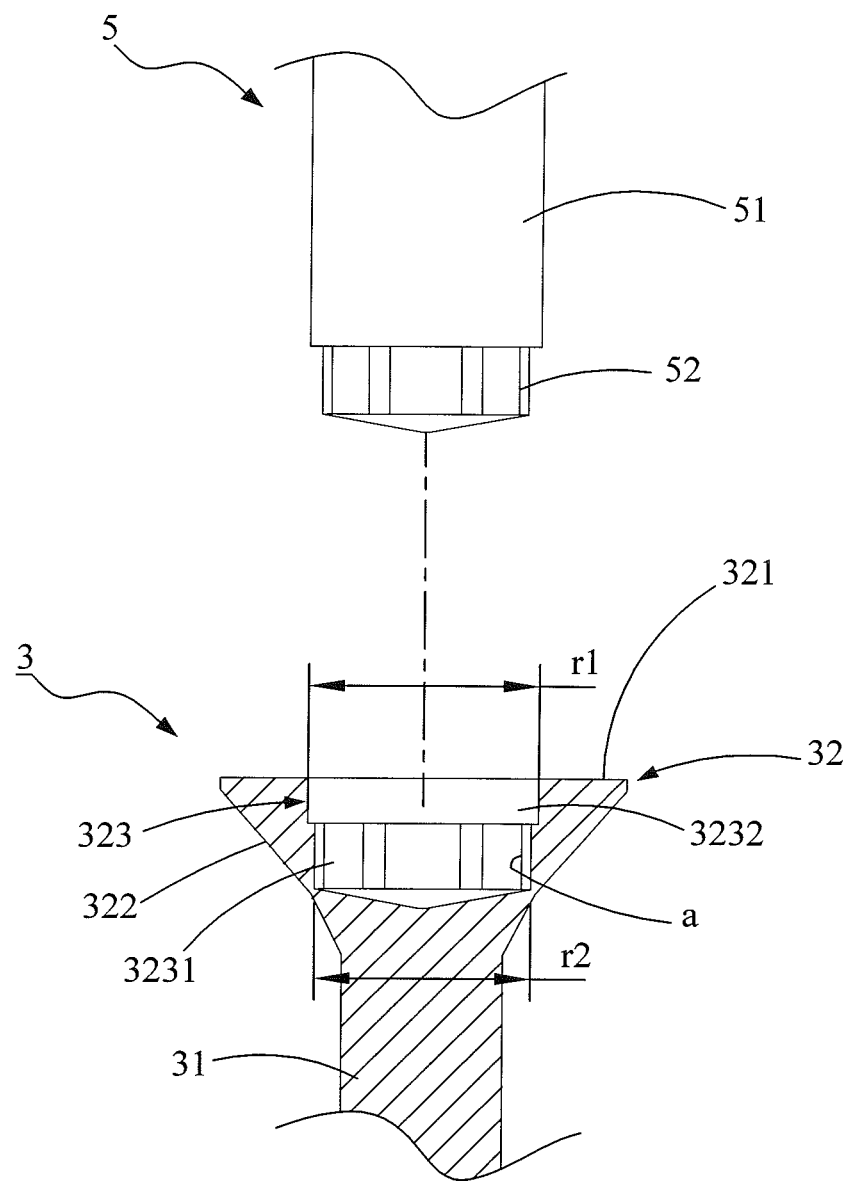
FIG. 4 is a cross-sectional view showing the head of the first preferred embodiment.

Referring to FIG. 3 and FIG. 4, a recessed head screw 3 of a first preferred embodiment of this invention includes a shank 31, a head 32 disposed at one end of the shank 31, a drilling portion 33 disposed at another end of the shank 31, and a plurality of threads 34 spirally disposed on the shank 31. The head 32 includes a top face 321 and a bottom face 322 connected between the top face 321 and the shank 31. The top face 321 has a socket portion 323 formed thereon for engaging a driving tool 5. Herein, the driving tool 5 has a shaft portion 51 and an insertion portion 52 connected to the shaft portion 51 for engaging the socket portion 323.

Figure 5:
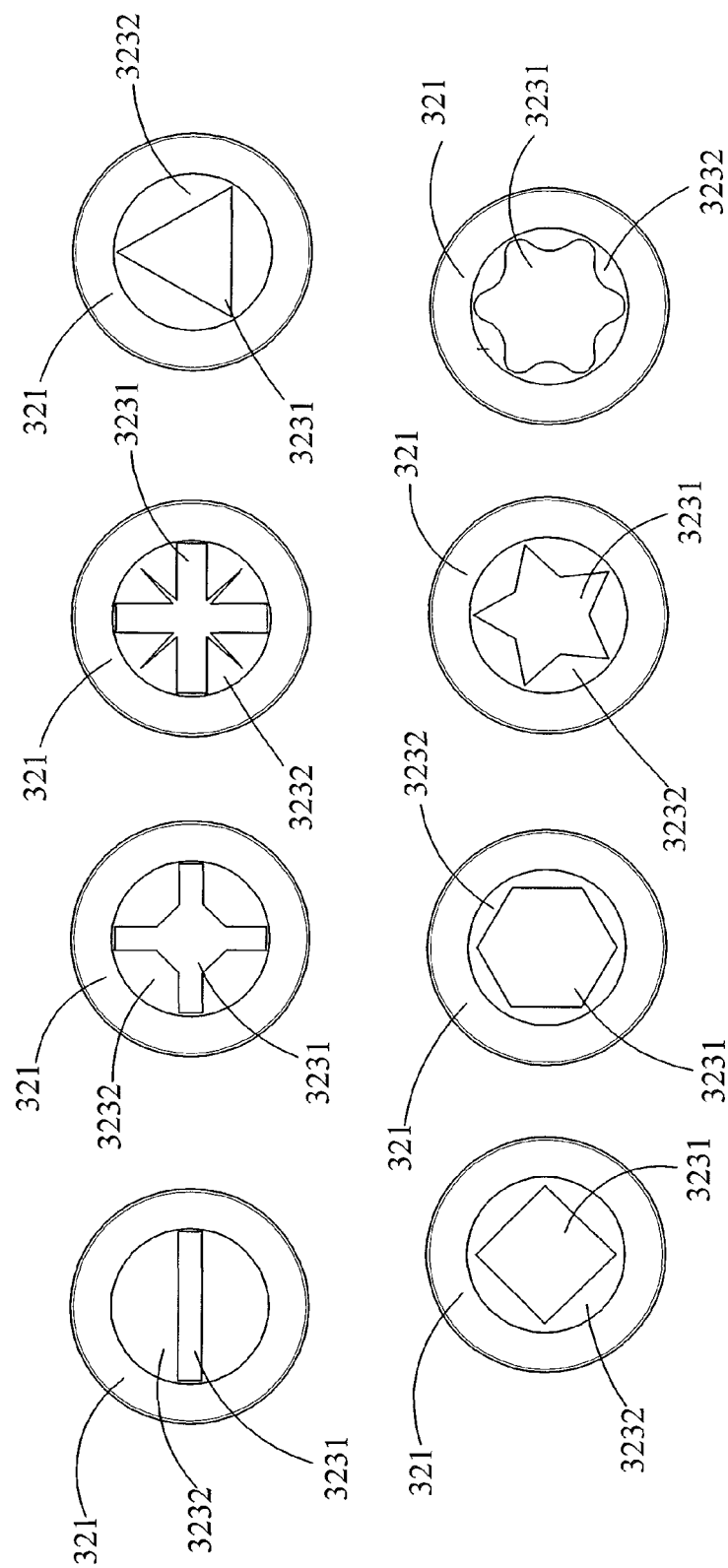
FIG. 5 shows top plan views of heads of the first preferred embodiment having different driving recesses.

The socket portion 323 has a driving recess 3231 formed therein and a driving socket 3232 formed between the driving recess 3231 and the top face 321. The driving recess 3231 is enclosed by a plurality of interconnected walls "a" so that the driving recess 3231 can have different shapes for adapting to different kinds of driving tools. When the insertion portion 52 of the driving tool 5 is inserted into the driving recess 3231, the shaft portion 51 of the driving tool 5 can be in close-fitting engagement with the driving socket 3232. The insertion portion 52 can be in loose or close-fitting engagement with the driving recess 3231 according to the shape and dimension of the insertion portion 52. In this preferred embodiment, it is adopted as an example that when the shaft portion 51 and the driving socket 3232 fit snugly to be in close-fitting engagement, the insertion portion 52 is in loose engagement with the driving recess 3231 to facilitate an easy entry or withdrawal of the driving tool 5. In addition, the driving socket 3232 may be in different shapes, preferably a circular shape in this preferred embodiment. The driving recess 3231, as shown in FIG. 5. can be a slotted recess, a cruciform recess, a Pozi recess, a triangular recess, a square recess, a star-shaped recess, a Torx recess, a polygonal recess which contains at least five walls, etc. Thus, the socket portion 323 can cooperate with different kinds of driving tool. The driving socket 3232 communicates with the driving recess 3231. Further, the driving socket 3232 can be preferably punched and formed by precision processing. Specifically, a diameter value r1 of the driving socket 3232 is a maximum circumscribed circle diameter value r2 of the driving recess 3231 plus a value within 20% of the maximum circumscribed circle diameter value r2. In other words, the diameter value r1 of the driving socket 3232 is within 120% of the maximum circumscribed circle diameter value r2 of the driving recess 3231. Thus, a maximum of the diameter value r1 is 1.2 times the maximum circumscribed circle diameter value r2. It is also possible that when the diameter value r1 is the diameter value r2 plus 0% of the diameter value r2, the diameter value r1 is equal to the maximum circumscribed circle diameter value r2, namely the diameter value r1 is 1 times the diameter value r2. Accordingly, if the driving socket 3232 is precisely processed and punched by the limitation as aforementioned, the engagement between the driving tool 5 and the socket portion 323 can be enhanced when the insertion portion 52 of the driving tool 5 enters the driving recess 3231. Further, the driving socket 3232 can fit in close engagement with the shaft portion 51 to prevent the driving tool 5 from escaping from or slipping out of the socket portion 323.

Figure 6:
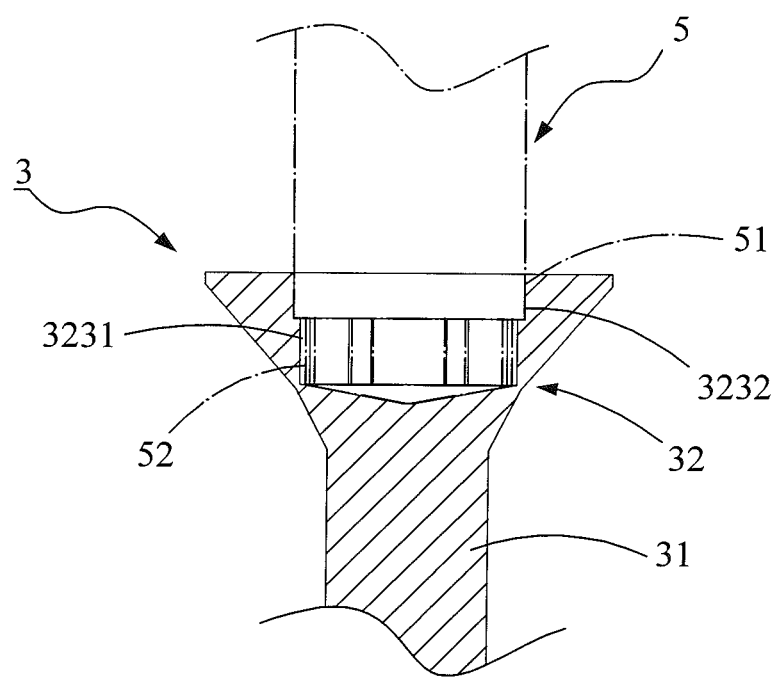
FIG. 6 is a schematic view showing the use of the first preferred embodiment.

The operation is described with the aid of FIG. 3 and FIG. 6. Before giving a driving force, a driving tool 5 is inserted into the socket portion 323 of the head 32 to make the insertion portion 52 touch the walls "a" of the driving recess 3231. Because the insertion portion 52 may be set to provide a size slightly smaller than the size of the driving recess 3231 for the sake of easy entry, there is appropriate space left between the insertion portion 52 and the walls "a" so that the insertion portion 52 can be in loose engagement with the driving recess 3231. Concurrently, because the driving socket 3232 formed between the top face 321 and the driving recess 3231 and punched by precision processing, the shaft portion 51 can fit snugly with the driving socket 3232, namely the shaft portion 51 is in close-fitting engagement with the driving socket 3232. On the whole, the engagement between the driving tool 5 and the socket portion 323 is largely increased to attain a firm engagement. Thus, the full driving force created by the driving tool 5 can be delivered to the head 32 efficiently and evenly. This firm and even behavior not only prevents the driving tool 5 from breaking the walls "a" of the driving recess 3231 but also prevents the driving tool 5 from slipping out of the socket portion 323. Thus, the screw 3 driven by the driving tool 5 does not fall off the driving tool 5 easily during the driving operation to obtain a complete driving work. If the user uses the driving tool 5 at a high altitude and gives the screw 3 an upward driving force, the screw 3 does not fall or drop down easily as the screw 3 still engages the driving tool 5 firmly. Thus, the screw 3 can provide a complete fastening operation to improve the working efficiency and the smoothness of the operation.

Figure 7:
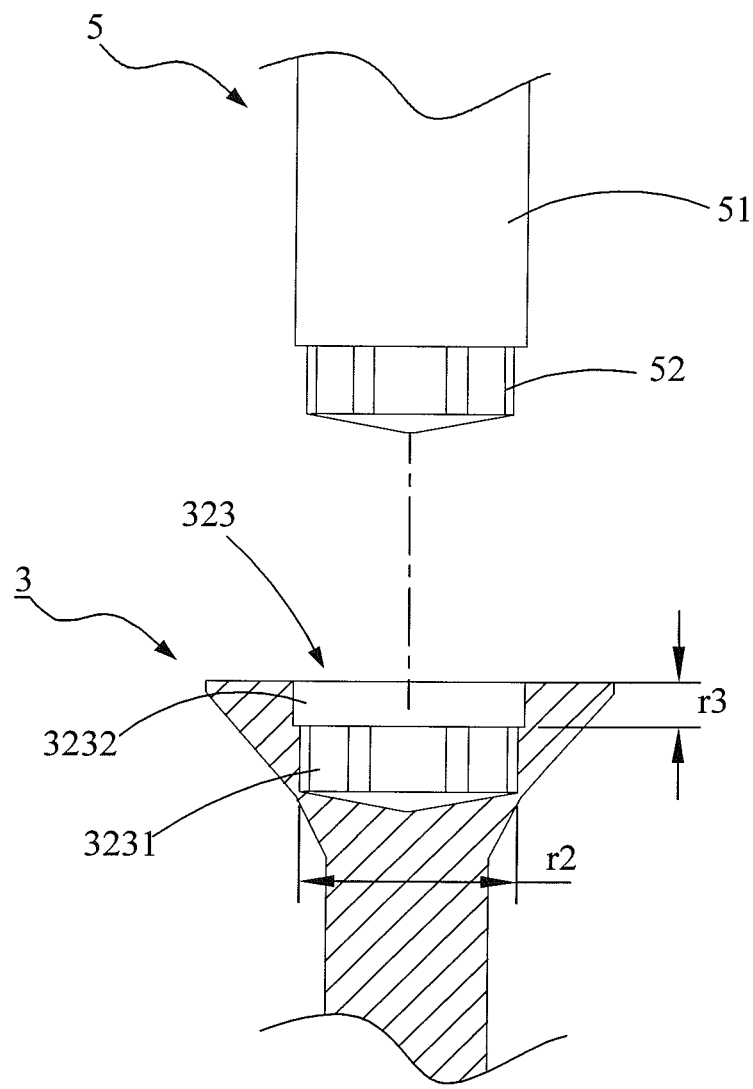
FIG. 7 is a cross-sectional view showing a second preferred embodiment of this invention.

Referring to FIG. 7, a recessed head screw 3 of a second preferred embodiment and that of the first preferred embodiment have the same elements, which are herein omitted. The second preferred embodiment is characterized in that a depth value r3 of the driving socket 3232 is at least 15% of the maximum circumscribed circle diameter value r2 of the driving recess 3231. When the driving tool 5 engages the socket portion 323, the depth value r3 which is at least 15% of the maximum circumscribed circle diameter value r2 helps increase the area where the driving socket 3232 of the screw 3 engages the shaft portion 51 of the driving tool 5 in order to enhance the close-fitting engagement therebetween. Thus, the driving tool 5 engages the driving socket 3232 firmly to prevent the swaying movement of the driving tool 5, prevent the slipping of the driving tool 5 out of engagement with the screw 3, and solve the falling problem of the screw 3. The enhanced engagement also helps deliver the driving force of the driving tool 5 to every wall "a" of the driving recess 3231 to attain an efficient and even driving operation whereby the walls "a" are not broken easily. Therefore, the working efficiency and smoothness can be improved and enhanced.

To sum up, the recessed head screw takes advantage of a driving recess formed in the head and a driving socket in communication with the driving recess formed between the driving recess and a top face of the head to provide a close-fitting engagement between a driving tool and the driving socket which can be punched by precision processing when the driving tool enters the driving recess. This invention increases and enhances the engagement of the driving tool with the socket portion and prevents the driving tool from escaping from the driving socket. The screw does not drop down from the driving tool easily during the driving action. Thus, the full driving force of the driving tool can be delivered to the head evenly to facilitate the fastening operation and improve the working efficiency and the smoothness of the operation.

While the embodiments of this invention are shown and described, it is understood that further variations and modifications may be made without departing from the scope of this invention.

What is claimed is:

1. A recessed head screw comprising a shank, a head disposed at one end of said shank, a drilling portion disposed at another end of said shank, and a plurality of threads spirally disposed on said shank about an axis, with said head including a top face and a bottom face connected between said top face and said shank, with said top face having a socket portion formed thereon;

wherein said socket portion has a driving recess formed therein and a driving socket formed between said driving recess and said top face, with said driving recess enclosed by a plurality of interconnected walls and having cross sections perpendicular to the axis, with said driving socket communicating with said driving recess, with the driving socket having cross sections perpendicular to the axis and of equal size from the driving recess to the top face, with shapes of the cross sections of the driving socket being outside of and different than shapes of the cross sections of the driving recess, said-driving socket having a circumscribed circle diameter value greater than a circumscribed circle diameter value of said driving recess and less than or equal to 1.2 times the circumscribed circle diameter value of said driving recess, said driving socket defining a driving socket depth at least 0.15 times the circumscribed circle diameter value of said driving recess.

2. The recessed head screw as claimed in claim 1, in combination with a driving tool having a shaft portion and an insertion portion connected to said shaft portion, with said shaft portion and said driving socket being in close-fitting engagement when said insertion portion is inserted into said driving recess.

3. The recessed head screw as claimed in claim 2, wherein said driving recess is a slotted recess, a cruciform recess, a cruciform recess with radial indentations set at 45° from the main cruciform recess, a triangular recess, a square recess, a star-shaped recess, a hexalobular recess, or a polygonal recess.

4. The recessed head screw as claimed in claim 1, wherein said driving recess is a slotted recess, a cruciform recess, a cruciform recess with radial indentations set at 45° from the main cruciform recess, a triangular recess, a square recess, a star-shaped recess, a hexalobular recess, or a polygonal recess.

5. The recessed head screw as claimed in claim 1, wherein the cross sections of the driving socket are circular.

6. The recessed head screw as claimed in claim 1, wherein the diameter value of said cross sections of the driving socket is 1.2 times the circumscribed circle diameter value of said cross sections of the driving recess.

* * * * *